Aug. 21, 1928.
J. C. COATES
1,681,699
TOOL JOINT LOCK
Filed Feb. 23, 1927
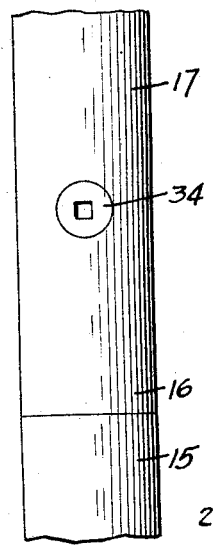
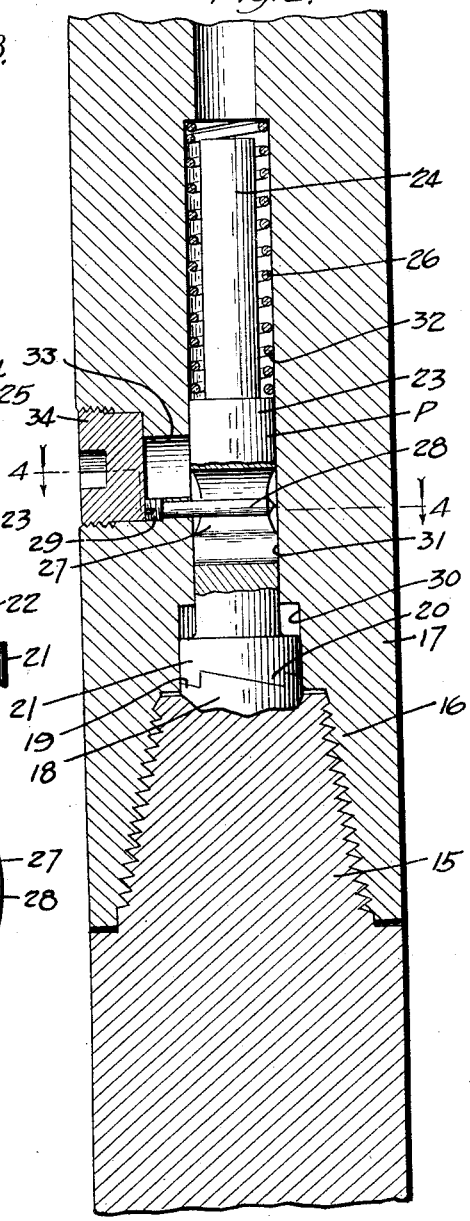
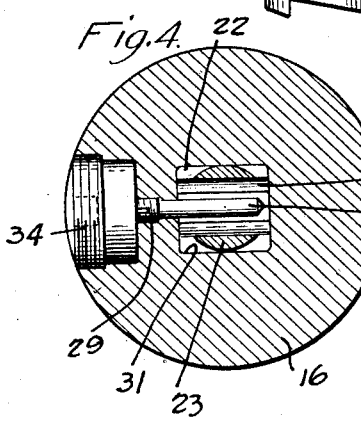
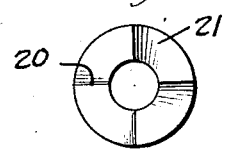
INVENTOR
JASPER CLAY COATES
BY
ATTORNEY Patented Aug. 21, 1928.

1,681,699

UNITED STATES PATENT OFFICE.

JASPER CLAY COATES, OF SANTA PAULA, CALIFORNIA.

TOOL JOINT LOCK.

Application filed February 23, 1927. Serial No. 170,273.

My invention relates to tool joints as used in a string of well drilling tools, and it has for its purpose the provision of a simple, durable and efficient device by which a tool joint is automatically and positively locked in coupled position against accidental uncoupling, and yet capable of being unlocked when it is desired to uncouple the joint. My invention is further characterized by the fact that it is not necessary to screw the pin completely home within the box in order to render the locking device effective, thereby eliminating the possibility of the pin breaking off at its point of juncture with the stem or other part of the string.

I will describe only one form of tool joint lock embodying my invention and only one form of tool joint to which it is applied, and will then point out the novel features thereof in the claim.

In the accompanying drawings

Figure 1 is a view showing in side elevation a tool joint having applied thereto one form of locking device embodying my invention;

Figure 2 is an enlarged vertical sectional view of the joint shown in Figure 1, with the locking device in applied position thereto;

Figure 3 is a detail view showing in side elevation the plunger of the locking device and taken at right angles to the plunger as shown in Figure 2;

Figure 4 is a transverse sectional view taken on the line 4—4 of Figure 2;

Figure 5 is a bottom plan view of the locking head of the plunger.

Referring specifically to the drawings, my invention in its present embodiment is shown incorporated in a tool joint of conventional form and which comprises a tapered pin 15, threaded in a tapered box 16, the latter part of a stem 17. The upper end of the pin 15 is provided with a locking head 18 having a circular series of ratchet teeth 19 extending in one direction for locking engagement with a similar series of teeth 20 extending in the opposite direction on the confronting face of a second locking head 21 formed on the lower end of and constituting part of a plunger designated generally at P. The remainder of the plunger comprises a shank having a squared portion 22 to which the head is connected, a rounded portion 23 and a second rounded portion 24 of reduced diameter to form a shoulder 25 at the junction of the two portions against which an expansible spring 26 is adapted to bear. Extending into each of the shank portions 22 and 23 is a slot 27 into which a pin 28 extends for limiting movement of the plunger vertically. This pin is provided with a screw head 29 threaded in the stem 17 to permit removal when desired. In applied position the plunger is positioned within the stem 17, the head 21 being received within a cavity 30 communicating with the inner end of the box 16 and of sufficient depth to allow limited vertical movement of the head and plunger. The shank portion 22 is received in a squared bore 31 of the stem, and the portion 23 and 24 in a rounded bore 32 of uniform diameter so as to accommodate the spring 26 in the manner shown.

With the plunger applied as described it is capable of movement vertically to elevate or lower the head 21, but is yieldably urged downwardly by means of the spring 26 so that the head 21 is normally projected from the cavity 31 into the box.

In practice, the pin is screwed into the box until the locking teeth of the locking heads 18 and 21 have proper engagement with each other, when the pin will be locked against unscrewing movement. Any attempt to unscrew the pin or box will be resisted by the head 21 as the plunger is locked against rotation by the squared shank portion. To effect secure locking it is not necessary to screw the pin completely home into the box as the locking heads will have proper locking engagement before the pin reaches this point. Hence the confronting shoulders of the pin and box can be left in spaced relation, thereby eliminating the possibility of shearing off the pin from torsional strains.

To permit uncoupling of the joint the head 21 can be elevated out of engagement with the head 18 by the insertion of a suitable tool (not shown) through an opening 33 in the stem 17 and into the slot 27, when, by forcing the tool upward, the plunger can be elevated against the tension of the spring 26 to raise the head 21 sufficiently to clear the head 18. The pin is now free to permit its unscrewing from the box. The opening 33 is normally closed by a screw plug 34 which has an angular cavity therein to permit the application of a suitable wrench thereto when desiring to remove the plug.

Although I have herein shown and described only one form of tool joint lock embodying my invention, it is to be understood that various changes may be made therein without departing from the spirit of the invention, and within the scope and spirit of the appended claim.

I claim:

In combination, a tool joint comprising a box having a threaded cavity and a reduced bore communicating with the cavity and having a cylindrical portion and a squared portion, a plunger having an enlarged toothed head movable within the cavity and a shank in the bore having cylindrical and squared portions disposed respectively in the corresponding portions of the bore, a threaded pin in said cavity and having a toothed head adapted to engage the first toothed head to lock the pin against unscrewing movement from the box, means for yieldingly urging the plunger and its toothed head toward the second toothed head, the plunger and the box being formed with openings, and a pin having an enlarged threaded portion threaded into said opening of the box and a second portion extending into the plunger for limiting the movement of the plunger under the action of said urging means, said box having a relatively large opening communicating with said plunger and box openings and through which an instrument is adapted to be extended into the plunger opening to manually move the plunger against the action of said urging means, and a plug threaded into said relatively large opening in covering relation to the outer end of the last mentioned pin.

JASPER CLAY COATES